United States Patent

Haga et al.

[11] Patent Number: 5,577,573
[45] Date of Patent: Nov. 26, 1996

[54] HYDRAULIC POWER STEERING APPARATUS

[75] Inventors: Kyosuke Haga, Anjo; Mikio Suzuki, Hekinan; Yoshiharu Inaguma, Nagoya; Kenichi Fukumura, Aichi-ken; Hideya Kato, Okazaki, all of Japan

[73] Assignee: Toyoda Koki Kabushiki Kaisha, Kariya, Japan

[21] Appl. No.: 357,757

[22] Filed: Dec. 16, 1994

[30] Foreign Application Priority Data

Dec. 16, 1993 [JP] Japan .................................. 5-316917
Dec. 12, 1994 [JP] Japan .................................. 6-307943

[51] Int. Cl.$^6$ ........................................................ B62D 5/06
[52] U.S. Cl. ........................................ 180/417; 180/423
[58] Field of Search .................................. 180/132, 141, 180/142, 143, 417, 423, 422, 442, 441

[56] References Cited

U.S. PATENT DOCUMENTS

| | | | |
|---|---|---|---|
| 4,473,128 | 9/1984 | Nakayama et al. | 180/141 X |
| 4,714,413 | 12/1987 | Duffy | 417/293 |
| 5,439,070 | 8/1995 | Haga et al. | 180/141 |
| 5,471,838 | 12/1995 | Suzuki et al. | 180/141 X |
| 5,474,145 | 12/1995 | Haga et al. | 180/132 |

FOREIGN PATENT DOCUMENTS

4319495  12/1993  Germany .

*Primary Examiner*—Kevin Hurley
*Attorney, Agent, or Firm*—Oblon, Spivak, McClelland, Maier & Neustadt, P.C.

[57] ABSTRACT

A hydraulic power steering system includes a pump, a flow control valve, and a bypass control valve. The flow control valve responds to a pressure drop across a metering orifice disposed in a fluid supply passage so as to control the flow rate of operating fluid by bypassing a part of the operating fluid to a reservoir. A spring chamber of the flow control valve is connected to the supply passage through a control orifice. The bypass control valve is disposed between the spring chamber and the reservoir so as to increase the amount of bypassed fluid by controlling the pressure in the spring chamber. The bypass control valve has a control spool, a load pressure introduction port connected to the upstream side of the control orifice for leading the load pressure to a first end of the control spool and a pilot port connected to the downstream side of the control orifice for leading the pressure in the spring chamber of the flow control valve to a second end of the control spool. Moreover, a pressure receiving area of the second end of the control spool is smaller than that of the first end of the control spool. Accordingly, a spring having a small spring constant can be used in the bypass control valve, even when the control spool is controlled within a short stroke. Further, the control spool, the load pressure introduction port, and the pilot port are formed in a sleeve.

6 Claims, 9 Drawing Sheets

FIG. 3
(CROSS REFERENCE)

HYDRAULIC POWER STEERING APPARATUS

BACKGROUND OF THE INVENTION

1. Field of the Invention

The present invention relates to a hydraulic power steering apparatus suitable for use in vehicles and the like. More particularly, the present invention relates to a hydraulic power steering apparatus which is capable of reducing the power consumption of a vehicle engine by decreasing the flow rate supplied from a pump to a control valve at a low load pressure. Further, the present invention relates to an improvement in a hydraulic power steering apparatus described in the co-pending U.S. application Ser. No. 08/304,923 of the same assignee as this application and another assignee.

2. Discussion of the Related Art

A hydraulic power steering apparatus is usually provided with a hydraulic pump and a flow control valve for supplying a pressurized fluid to an assist force generating mechanism at a constant flow rate. In such a power steering system, the energy consumed by the hydraulic pump increases in accordance with an increase in the flow rate of the pressurized fluid. Therefore, the conventional hydraulic pump consumes a large amount of energy or power.

Figure 1:
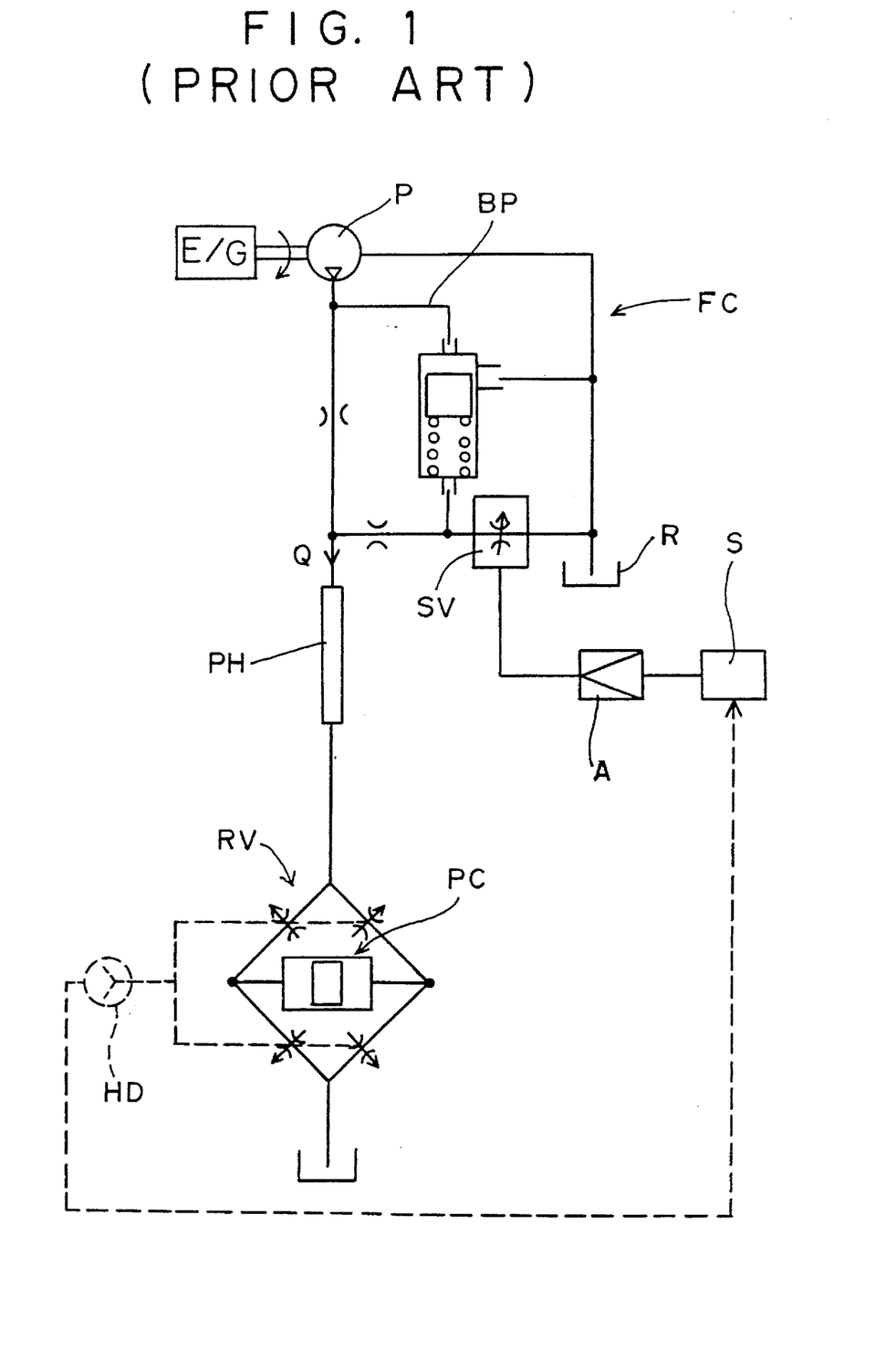
FIG. 1 is a diagram showing a conventional power steering apparatus.

In order to solve the above-mentioned problem, improved power steering apparatuses have been proposed for reducing the flow rate of pressurized fluid during high speed traveling. Examples of such power steering apparatuses are shown in Japanese Patent Publication No. 54-5571 and U.S. Pat. No. 4,714,413. For example, in the apparatus of Japanese patent publication No. 54-5571, there is provided a vehicle speed sensor S, an amplifier A for amplifying a signal from the sensor S, and an electromagnetic valve SV which responses to the amplified speed signal, as shown in FIG. 1. The valve SV operates to reduce the pressure in a spring chamber of a flow control valve FC in accordance with an increase of the vehicle speed, thereby reducing the flow rate of the pressurized fluid supplied to the assist force generating mechanism which is composed of a rotary valve RV and a power cylinder PC. This system reduces the energy consumption of the hydraulic pump p. The power steering system also has the desirable characteristic that assist forces generated during high speed traveling are smaller than those during low speed traveling.

The conventional power steering apparatuses, however, have the following drawback. Namely, when the steering wheel HD is turned, the flow rate of the fluid flowing through the electromagnetic valve SV increases compared with that when the steering wheel HD remains at its neutral position, because the opening degree of the electromagnetic valve SV depends exclusively on the vehicle speed. Thus, the flow rate of the fluid to the rotary valve RV is decreased, whereby the characteristics of the power assist during high speed is undesirably changed. To avoid this problem, there must be provided a pressure compensation valve which acts upon an increase of the pressure upstream of the rotary valve RV.

Figure 2:
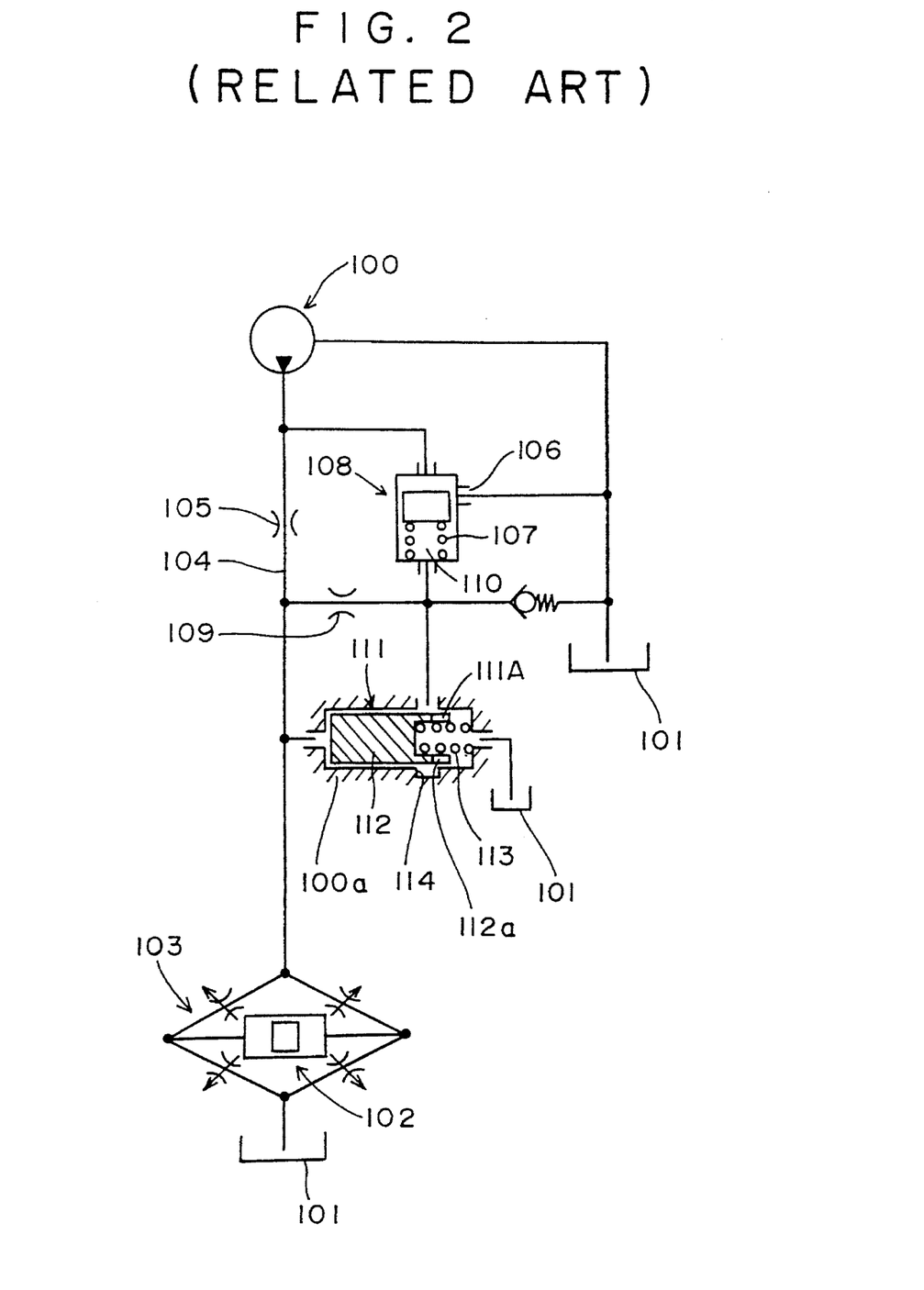
FIG. 2 is a diagram showing a power steering apparatus which is not prior art against the present invention.

To improve this drawback, another power steering apparatus has been proposed, which, as shown in FIG. 2, is mainly composed of an engine-driven pump 100 for discharging operating fluid, a reservoir 101, a power cylinder 102 for assisting the steering operation, a control valve 103 for controlling operating fluid which is supplied from the pump 100 to the power cylinder 102, upon rotation of the steering wheel (not shown), a flow control valve 108 and a load pressure responsive valve 111.

The flow control valve 108 has at the back thereof a spring chamber 110 in which a spring 107 is disposed. The flow control valve 108 is disposed in a bypass passage 106 to control the flow of fluid flowing from an inlet port to an outlet port of the flow control valve 108. A port of the spring chamber 110 is connected to a supply passage 104 via a control orifice 109 and to the reservoir 101 via a relief valve (not numbered). The flow control valve 108 responds to the pressure difference across a metering orifice 105 disposed in the supply passage 104 which connects the pump 100 to the control valve 103, so that the bypass passage 106 is opened and closed by the flow control valve 108 to maintain the flow rate of operating fluid supplied to the control valve 103 constant.

The port of the spring chamber 110 is also connected to the reservoir 101 via the load pressure responsive valve 111. A control spool 112 of this valve 111 is directly slidably inserted in a pump housing 100a. A variable orifice 111A composed of a slits 112a formed at a rear end of the control spool 112 and a annular groove 114 are formed in the pump housing 100a.

When the steering wheel is at a neutral state, the load pressure remains low. Therefore, the control spool 112 of the valve 111 remains urged to the left as viewed in FIG. 1 by a spring 113 arranged at the rear end of the control spool 112, so that it maintains the largest opening area of the variable orifice 111A. With this state, the pressure in the spring chamber 110 of the flow control valve 108 is released to the reservoir 101 via the variable orifice 111A and remains low. This causes the bypass passage 106 of the flow control valve 108 to open much more, so that the operating fluid from the pump 100 is bypassed to the reservoir 101 much more, thereby decreasing the flow rate of the fluid supplied to the control valve 103. As a result, the energy consumed by the pump 100 can be reduced.

When the steering wheel is turned, the pressure on the supply passage 104 upstream of the control valve 103 (that is to say, the "load pressure") gradually increases. When the load pressure exceeds a predetermined pressure in this state, the control spool 112 is moved to the right as viewed in FIG. 2 against the force of the spring 113 to diminish the opening area of the variable orifice 111A. When the load pressure further increases, the opening area of the variable orifice 111a is completely closed. This causes the pressure in the spring chamber 110 of the flow control valve 108 to increase, so that the flow control valve 108 is displaced to close the bypass passage 106. Therefore, the flow rate supplied to the control valve 103 is increased as the load pressure increases, so that the power assist is generated.

The load pressure responsive valve 111, however, has the following drawbacks. Once the spool 112 begins to move against the spring force of the spring 113, it is moved to the right end without taking an intermediate position. This causes an abrupt increase of the power assist, thereby giving the driver an unpleasant feeling.

Another related art is Japanese unexamined patent publication no. 6-171522, which discloses another power steering apparatus in which the power consumption is reduced during low load pressure and high speed traveling. This power steering apparatus has the same configuration as shown in FIG. 2 and is further provided with a traveling speed responsive valve which is arranged in parallel to the load pressure responsive valve 111. The traveling speed responsive valve controls the flow rate bypassing the load pressure responsive valve 111 so as to change the degree of the opening area thereof in response to the vehicle speed. At low traveling speeds, the pressure in the spring chamber 110 is discharged to the reservoir 101 mainly through the variable orifice 111A of the load pressure responsive valve 111, thereby increasing the flow rate supplied to the control valve 103, because a variable orifice of the traveling speed responsive valve remains completely closed. On the other hand, at high traveling speeds, the pressure in the spring chamber 110 is discharged to the reservoir 101 mainly through the variable orifice of the traveling speed responsive valve, thereby reducing the flow rate supplied to the control valve 103, because the traveling speed responsive valve is larger in opening area than the load pressure responsive valve 111. With this operation, the energy consumption and the stability at high speed traveling are ensured.

In such a power steering apparatus, when the vehicle runs at high speeds with the steering wheel at around the neutral position thereof, the opening area of the traveling speed responsive valve is set to be responsive to the traveling speed, so that the pressure in the spring chamber 110 of the flow control valve 108 is drained to the reservoir 101 in dependence upon the vehicle speed. Thus, the flow rate supplied to the control valve 103 can be reduced in response to the traveling speed.

However, in the power steering apparatus constructed above, when the load pressure increases upon rotation of the steering wheel during high speed traveling, the differential pressure across the variable orifice of the traveling speed responsive valve increases to increase the flow rate which is drained to the reservoir 101. As a result of this operation, the flow rate supplied to the control valve 103 cannot be controlled in accordance with the traveling speed. To solve this problem, a power steering apparatus must be provided with a pressure compensation valve downstream of the traveling speed responsive valve. The addition of such a pressure compensation valve causes manufacturing costs to increase.

Figure 3:
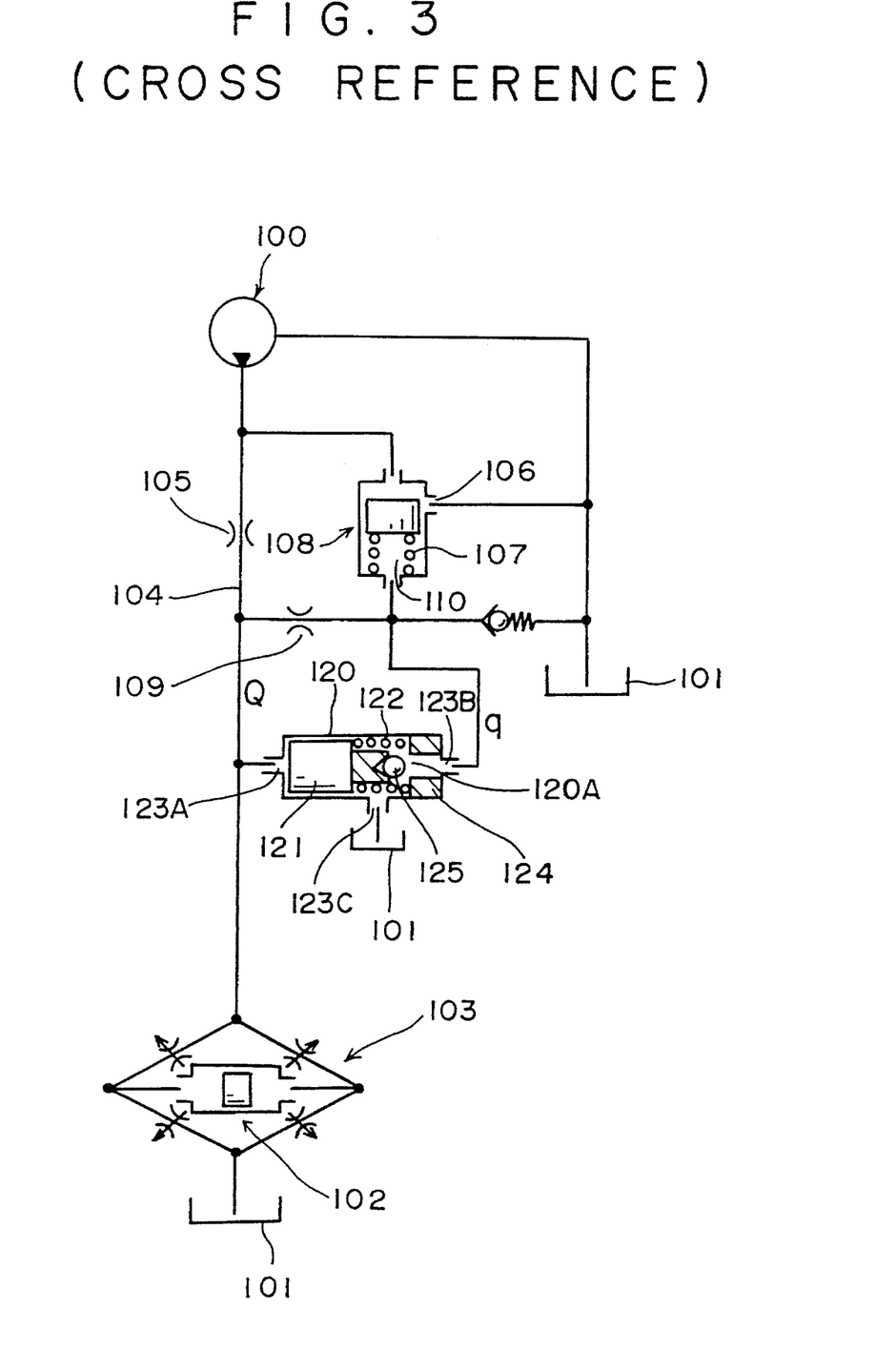
FIG. 3 is a diagram showing a power steering apparatus proposed in a co-pending application.

The assignee of this application has proposed in the cross-referenced co-pending U.S. application Ser. No. 08/304,923 an improved power steering apparatus provided with a bypass control valve 120 as shown in FIG. 3, instead of the load pressure responsive valve 111 in FIG. 2. The bypass control valve 120 has a load pressure inlet port 123A at one end and a pilot port 123B at the other end. The inlet port 123A is connected upstream of the control orifice 109, while the pilot port 123B is connected downstream of the control orifice 109. The valve 120 comprises a control spool 121 having a first end facing the inlet port 123A, a ball 125 held on a second end of the control spool 121 opposite to the first end, a valve seat member 124 disposed adjacent to the pilot port 123B to permit the ball 125 to seat thereon, and a spring 122 disposed between the control spool 121 and the valve seat member 124 to urge the control spool 121 in a direction to separate the ball 125 from the valve seat member 124. The valve seat member 124 is formed with a passage in communication with the pilot port 123B. The ball 125 faces an inner opening of the passage to form a pressure receiving area which is smaller in area than the first end of the control spool 121. A chamber formed between the control spool 121 and the valve sheet member 124 is in communication with the reservoir 101 through a drain port 123C.

When the control valve 103 is in its neutral state, the load pressure is at a low level $P_A$ so that only a small differential pressure is produced across the control orifice 109. In this state, a variable throttle 120A of the bypass control valve 120 is fully opened due to the spring force of the spring 122.

Figure 6:
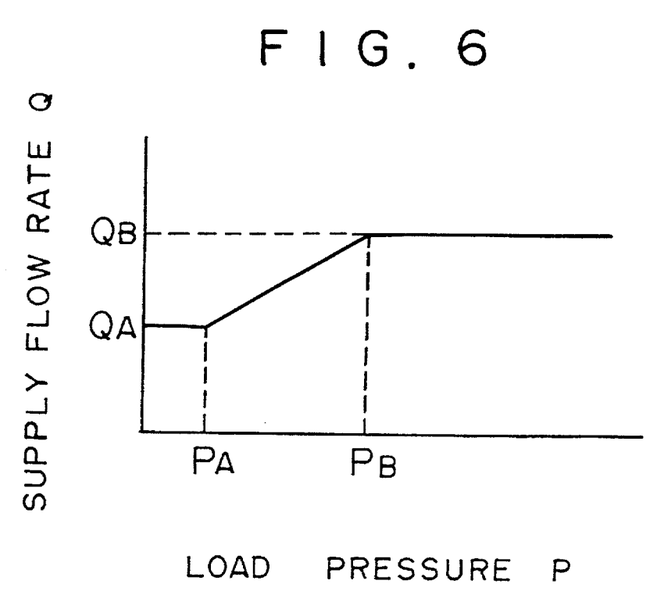
FIG. 6 is a graph showing the relationship between the supply flow rate to the control valve and the load pressure in the first embodiment.

As a result, the spring chamber 110 of the flow control valve 108 communicates with the reservoir 101, so that the pressure in the spring chamber 110 is lowered. This causes the flow control valve 108 to retract so as to open the bypass passage 106. Accordingly, a substantial part of the operating fluid discharged from the pump 100 is mostly bypassed to the reservoir 101. With this operation, the flow rate of the operating fluid supplied to the control valve 103 is reduced to the lowest value $Q_A$, as shown in FIG. 6.

Figure 5:
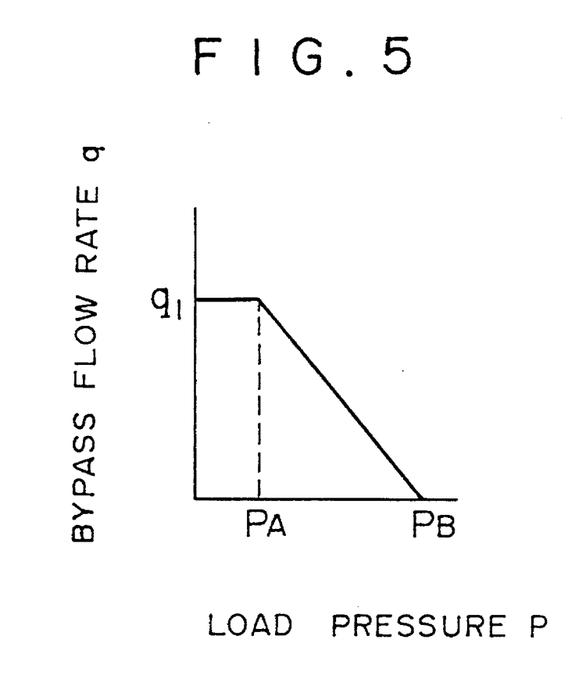
FIG. 5 is a graph showing the relationship between the bypass flow rate and the load pressure in the first embodiment.

When a steering wheel (not shown) is turned, the upstream pressure of the control valve 103, i.e., load pressure, gradually increases as is well known in the art. When the load pressure increases, the differential pressure across the control orifice 109 increases. When the differential pressure reaches a predetermined level, the control spool 121 is moved toward the pilot port 123B against the spring force of the spring 122, thereby decreasing the opening area of the variable throttle 120A. When the differential pressure across the control orifice 109 is further increased due to a further increase of the load pressure, the control spool 121 of the bypass control valve 120 closes the pilot port 123B, so that the flow rate q of pilot fluid flowing into the pilot port 123B is decreased to zero, as shown in FIG. 5. With this operation, the pressure in the spring chamber 110 of the flow control valve 108 increases, so that the flow control valve 108 moves toward the direction to close the bypass passage 106. As a result, the flow rate of the operating fluid to the control valve 103 is increased as the load pressure increases. When the load pressure reaches $P_B$, the flow rate reaches the maximum rate $Q_B$ sufficient to generate a required assisting force.

However, the control spool 121 is disposed at the inner surface of the pump housing 100a, so that the annular groove 114 has to be formed in pump housing 100a. This requires machining of the pump housing 100a from the inside thereof. Therefore, the machining of the annular groove 114 is difficult.

SUMMARY OF THE INVENTION

Accordingly, a primary object of the present invention is to provide an improved power steering apparatus capable of reducing energy consumption.

Another object of the present invention is to provide an improved power steering apparatus having a bypass control valve which is easily to machine.

A further object of the present invention is to provide an improved power steering apparatus of the character set forth above which is capable of controlling the supply flow rate to a control valve in dependence on the traveling speed of a vehicle.

Briefly, the present invention provides a hydraulic power steering apparatus having a pump for supplying an operating fluid, a power cylinder, a reservoir, and a control valve connected to said pump, said power cylinder and said reservoir, and responsive to a steering operation for controlling a supply of the operating fluid to said power cylinder. The power steering apparatus comprises a metering orifice disposed in a supply passage connecting said pump with said control valve, a flow control valve disposed in a bypass passage connecting to the supply passage upstream of said metering orifice and including a valve spool and a spring disposed in the spring chamber formed at the back of said valve spool, said spring chamber being connected to said supply passage downstream of said metering orifice via a control orifice, and a bypass control valve disposed in a passage connecting said control orifice and said spring chamber to said reservoir and so as to bypass the operating fluid from downstream of said metering orifice to said reservoir to lower the pressure in said spring chamber.

The bypass control valve further comprises a valve body, a valve sleeve of a generally cylindrical shape fit in a generally cylindrical bore of said valve body, a valve spool movable within said valve sleeve, a valve seat provided bodily with said valve sleeve and having a passage in communication with said spring chamber and said control orifice, a resilient means received within said valve sleeve for urging said valve spool against said valve seat, a drain port formed in said sleeve and connected with said reservoir, and a load pressure inlet port formed in said valve sleeve to apply the pressure upstream of said control orifice to said valve spool, wherein said valve spool is movable responsive to a difference in pressure across said control orifice to control the flow rate of fluid from said passage of said valve seat to said drain port, and wherein said valve spool, said valve seat and said resilient means are held within said valve sleeve to be removable bodily with said valve sleeve from said valve body.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

First Embodiment

Figure 4:
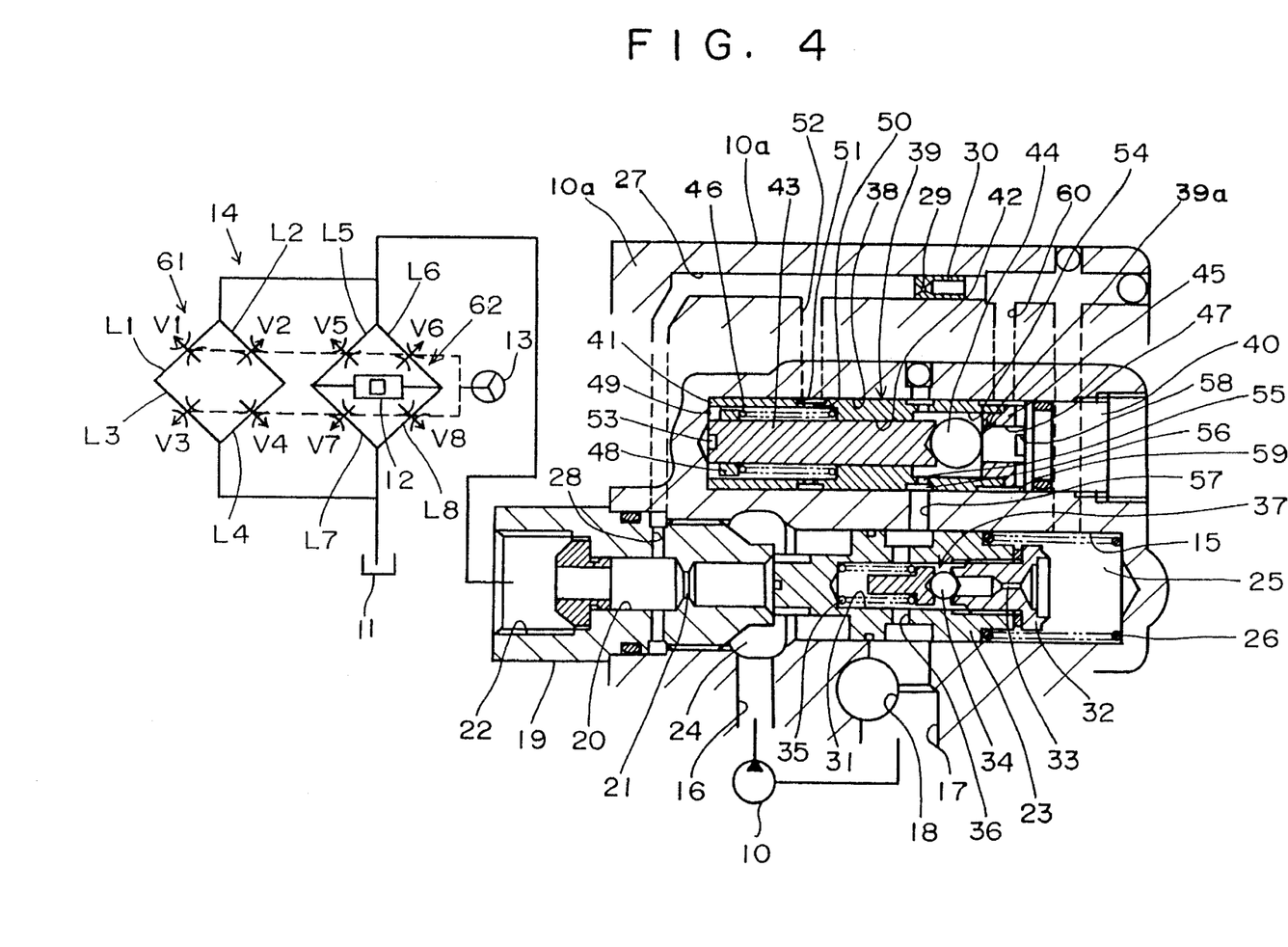
FIG. 4 shows a power steering apparatus according to a first embodiment, having an improved bypass control valve shown fragmentarily.

Referring now to FIG. 4, a hydraulic power steering apparatus according to the present invention is mainly composed of a pump 10 which is driven by an automotive engine (not shown), a reservoir 11, a power cylinder 12 for assisting the steering operation and a rotary control valve 14 for controlling the flow of operating fluid from the pump 10 to the power cylinder 12 upon rotation of a steering wheel 13.

In FIG. 4, numeral 10a denotes a pump housing of the pump 10, in which a valve receiving bore 15 is formed. A supply passage 16 and a bypass passage 17 open to the valve receiving bore 15 at axially spaced points for connection respectively with an outlet port and an inlet port of the pump 10. An inlet passage 18 in connection with the reservoir 11 opens into the bypass passage 17.

A union 19 formed with a supply bore 20 therein is threadedly engaged with one end of the valve receiving bore 15. A metering orifice 21 is formed at the middle of the supply bore 20. Further, an outlet port 22 is formed at one end opposite to the valve receiving bore 15 for connection with the control valve 14.

Moreover, a flow control valve 23 is slidably received in the valve receiving bore 15 and is urged against the union 19 by a spring 26 in a spring chamber 25 to restrict the communication between the supply and bypass passages 16 and 17.

A small radial hole 28 is formed in the union 19 and opens at inner end into the supply bore 20 downstream of the metering orifice 21 and at other end into a connection passage 27 formed in the pump housing 10a. The hole 28 is in communication with the spring chamber 25 via the connection passage 27. A control orifice 29 is disposed in the connection passage 27. The orifice 29 is formed in an orifice member 30 press-fitted in the passage 27. With this constitution, a part of the operating fluid downstream of the metering orifice 21 is led to the spring chamber 25 through the control orifice 29, so that the differential pressure across the metering orifice 21 acts on both opposite end surfaces of the flow control valve 23. This causes the flow control valve 23 to move axially in response to the differential pressure. As a result, the area between the flow control valve 23 and the bypass passage 17 is adjusted to maintain the differential pressure across the metering orifice 21 constant.

A first valve seat 32 is threadedly fixed in one end of a valve bore 31 formed in the flow control valve 23. The valve bore 31 is in communication with the spring chamber 25 through a small hole 33 which is formed in the first valve seat 32. A ball 34 urged by a spring 35 for contact with the valve seat 32 is received in the valve bore 31 to close the small hole 33 upon contact with the valve seat 32. The valve bore 31 communicates with the aforementioned bypass passage 17 via a cross hole 36 formed in the flow control valve 23. The small hole 33, the ball 34 and the spring 35 constitute a relief valve 37. With this constitution, when the pressure in the spring chamber 25 exceeds a predetermined relief pressure, the ball 34 is moved to the left as viewed in FIG. 4 against the spring 35, whereby the pressure in the spring chamber 25 is discharged to the bypass passage 17.

The pump housing 10a is also formed with another or second valve receiving bore 38 which extends in parallel to the aforementioned or first valve receiving bore 15 and which opens at a position opposite to the opening of the first valve receiving bore 15. A bypass control valve 39 is received in the second valve receiving bore 38 in the form of a cartridge and is secured by an end cap 40 threadedly fitted into the opening of the second valve receiving bore 38, so that the valve 39 is prevented from moving in a direction thereof.

The valve 39 in the form of a cartridge is composed of a sleeve member 41 fitted in the bore 38, a spool valve 43 received in a spool bore 42 formed in the member 41, a ball 44 held on a conical concave surface of the spool valve 43, a valve seat 45 facing the ball 44, and a spring 46 urging the spool valve 43 against the valve seat 45. The ball 44 fixed on the spool valve 43 and the valve seat 45 form a variable orifice 39a therebetween. The diameter $D_A$ Of the spool valve 43 is set to be larger than the diameter $D_B$ of a passage 47 formed in the valve seat 45 (DA>DB). Thus, a pressure receiving area of the spool valve 43 which receives the pressure upstream of the control orifice 29 (the load pressure) is larger than that which receives the pressure downstream of the control orifice 29. Accordingly, the spool valve 43 is movable responsive to a smaller differential pressure across the control orifice 29.

The spring 46 is disposed between the sleeve member 41 and an engaging member 48 press-fitted on the spool valve 43. The connection passage 27 upstream of the control orifice 29 is in communication with a spring chamber 49 through a connection path 52 formed in the pump housing 10a and through an annular groove 51 and pin holes 50 which are formed in the sleeve member 41. A cross groove 53 is formed at a rear end of the spool valve 43 to lead thereto the pressure upstream of the control orifice 29.

A ball chamber 54 with the ball 44 therein is in communication with the bypass passage 17 through pin holes 55 and an annular groove 56 formed in the sleeve member 41, a connection path 57 formed in the pump housing 10a, and the valve receiving bore 15 (an annular groove in the valve 23). Further, the passage 47 of the valve seat 45 is in communication with the connection passage 27 downstream of the control orifice 29 through a cross groove 58 formed at an end surface of the valve seat 45, which surface is contact with the end cap 40, an annular groove 59 formed in the sleeve member 41, and a connection path 60 formed in the pump housing 10a.

With this configuration, the pressure in the spring chamber 25 of the flow control valve 23 can be controlled depending upon the change in the opening area of the variable orifice 39a.

The control valve 14 is of a rotary type as described in a co-pending patent application Ser. No. 08/075,307 and is composed of a first bridge circuit 61 and a second bridge circuit 62. The first bridge circuit 61 includes four variable orifices V1, V2, V3 and V4 disposed in the line of fluid paths L1, L2, L3 and L4 which are connected to the pump 10 and the reservoir 11. Each of the variable orifices V1, V2, V3 and V4 is of semi-center-open type shown in FIG. 19 of that co-pending application. The orifices V1–V4 may be of the center-open type shown in FIG. 21 of that co-pending application.

The second bridge circuit 62 includes four variable orifices V5, V6, V7 and V8 disposed in the line of fluid paths L5, L6, L7 and L8 which are connected to the pump 10, opposite fluid chambers of the power cylinder 12 and the reservoir 11. Each of the variable orifices V5 and V6 communicating with the pump 10 is of center-closed type that is shown in FIG. 20 of that co-pending application, and each of the variable orifices V7 and V8 communicating with the reservoir 11 is of center-open type that is shown in FIG. 21 of that co-pending application. Concerning the control valve 14, the relevant parts of the description in the co-pending application Ser. No. 08/075,307 are incorporated herein.

Operation

The operation of the power steering apparatus as constructed above will now be described.

When the operation of the pump 10 is initiated by the vehicle engine, the operating fluid is supplied from an outlet port of the pump 10 to the supply passage 16. The operating fluid led to the pressure chamber 24 is supplied from the outlet port 22 of the union 19 to the control valve 14 through the metering orifice 21. The operating fluid after passing the metering orifice 21 is led to the spring chamber 25 of the flow control valve 23 through the radial hole 28, the connection passage 27 and the control orifice 29. The operating fluid after passing the metering orifice 21 is also supplied to the annular groove 51 of the bypass control valve 39 through the connection path 52 which is in communication with the connection passage 27 upstream of the control orifice 29. The operating fluid after passing the control orifice 29 is also supplied to the annular groove 59 of the bypass control valve 39 through the connection path 60. In the bypass control valve 39, the operating fluid is supplied to the spring chamber 49 from the annular groove 51 through the pin holes 50, while it is supplied to the passage 47 formed in the valve seat 45 from the annular groove 59 through the cross groove 58. Further, the operating fluid from the passage 47 is led to the bypass passage 17 through the variable orifice 39a, the ball chamber 54, the pin holes 55, the annular groove 56, the connection path 57 and the valve receiving bore 15.

Namely, the operating fluid is controlled to a constant flow rate by means of the metering orifice 21 and the flow control valve 23 and then is divided to a bypass flow rate q which is supplied to the bypass passage 17 through the variable orifice 39a of the bypass control valve 39, and a supply flow rate Q supplied to the control valve 14.

When the steering wheel 13 is not rotated, i.e., the control valve 14 is at around the neutral position, since the center-closed variable orifices V5 and V6 of the second bridge circuit 62 remain closed, the operating fluid to the control valve 14 is exhausted to the reservoir 11 through the semi-center-open (or center-open) variable orifices V1, V2, V3 and V4 of the first bridge circuit 61. In such a state, since the opposite fluid chambers of the power cylinder are in connection with the reservoir 11 through the center-open variable orifices V7 and V8, the pressure in the power cylinder remains at a low pressure. Namely, the operating fluid is not supplied to the opposite fluid chambers of the power cylinder 12 in this state, so that the rigidity of the steering wheel 13 can be increased with the steering wheel 13 being at around the neutral position.

At this time, the load pressure p (pressure downstream of the metering orifice 21) remains low, so that the differential pressure across the control orifice 29 remains small. In this state, the opening area of the variable orifice 39a of the bypass control valve 39 is fully opened to drain the bypass flow rate $q_l$ to the bypass passage 17, so that the spring chamber 25 of the flow control valve 23 is in communication with the bypass passage 17 through the variable orifice 39a, whereby the pressure in the spring chamber 25 remains approximately at atmosphere pressure. With this operation, the flow control valve 23 remains in position to sufficiently open the bypass passage 17, so that a substantial part of the operating fluid from the pump 10 is bypassed to the inlet port of the pump 10 through the bypass passage 17. Accordingly, the supply flow rate Q of the operating fluid which is supplied to the control valve 14 is kept to be the lowest flow rate $Q_A$ shown in FIG. 6. This advantageously results in reducing the energy consumed by the pump 10.

When the steering wheel 13 is rotated from this state in a certain direction, the opening areas of the variable orifices V1, V4 and V8 are diminished and those of the variable orifices V2, V3 and V7 are increased, at the same time as which the opening area of the center-closed variable orifice V6 begins to open although that of the center-closed variable orifice V5 remains closed. Thus, the operating fluid drained to the reservoir 11 through the control valve 14 is reduced, whereby the pressure p in the supply bore 20 is gradually increased from the pressure $P_A$ shown in FIG. 5. This makes the spool valve 43 begin to move against the spring 46 toward the right as viewed in FIG. 4, so that the opening area of the variable orifice 39a is diminished. Further, when the load pressure p is increased to the pressure $P_B$ shown in FIG. 5, the spool valve 43 is further moved in the same direction until the opening area of the variable orifice 39a is completely closed. As a result, the bypass flow rate q which is led from the ball chamber 54 to the bypass passage 17 becomes zero, as shown in FIG. 5. Thus, the flow control valve 23 is moved to close the supply passage 17 as the pressure in the spring chamber 25 of the flow control valve 23 increases, so that the supply flow rate Q of the operating fluid to the flow control valve 14 is increased to the maximum supply flow rate $Q_B$ shown in FIG. 6, which is sufficient for the power cylinder 12 to operate.

As constructed above, the bypass control valve 39 is in the form of a cartridge wherein all the components for the valve 39 are housed within the sleeve member 41, so that repair and maintenance can be easily done by removing the sleeve 41 from the pump housing 10a. Further, because the annular grooves 51, 56 and 59 are formed on the external surface of the sleeve member 41, it is not required to machine the annular grooves 51, 56 and 59 on the bore internal surface of the pump housing 10a, so that the valve 39 can be easily manufactured.

Moreover, the spool valve 43 is easily movable responsive to a smaller pressure difference in thrust force across the control orifice 29 which is attributed to the difference in diameter between the spool valve 43 and the passage 47. This advantageously makes the design of the spring 46 easy: namely a weak spring can be used for incorporation into a small space.

Although the bypass control valve 39 is of a ball poppet type, it is not limited to the ball poppet type. Bypass control valves of other types can be used in substitution therefor.

Second Embodiment

Figure 8:
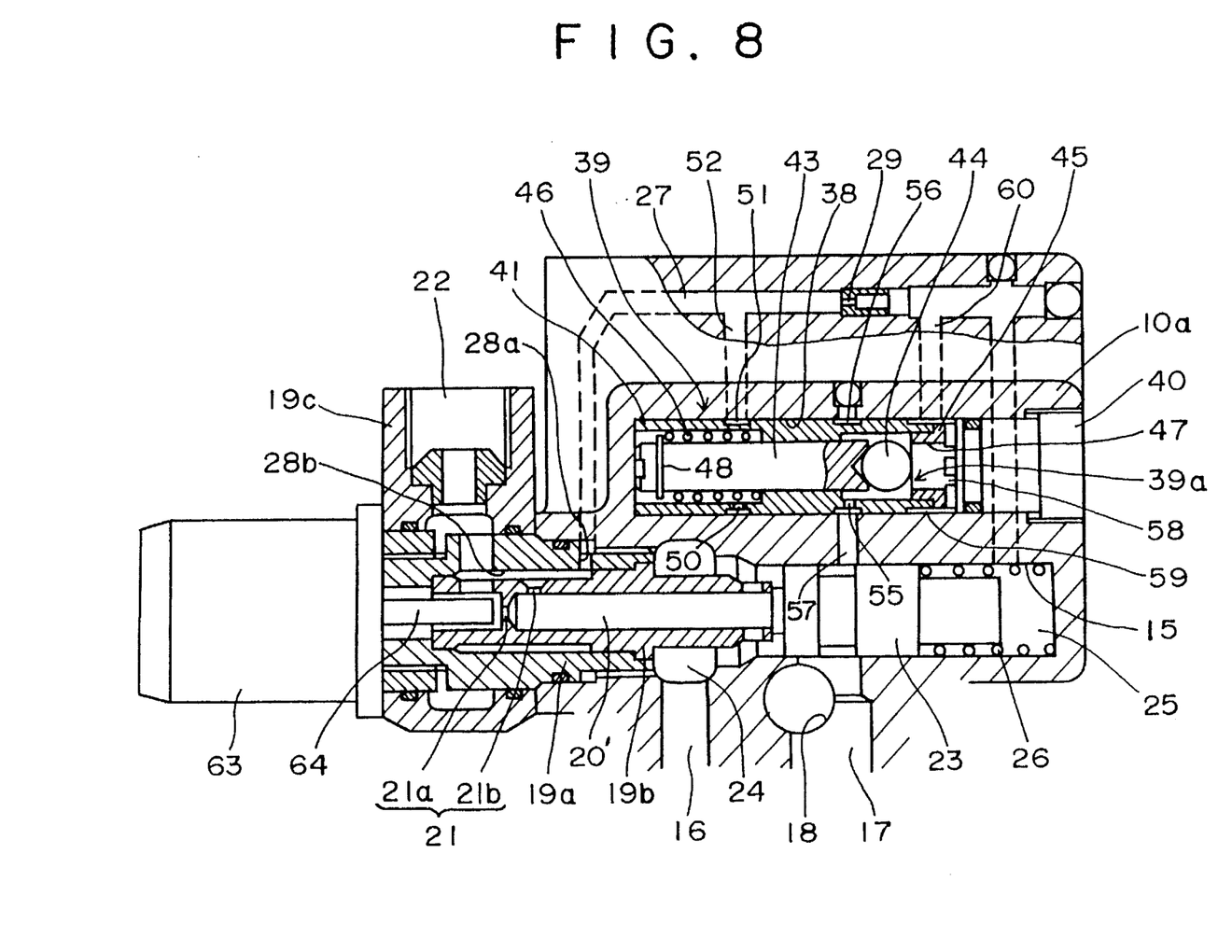
FIG. 8 is a sectional view similar to FIG. 4, of the apparatus in the second embodiment shown in FIG. 7.
Figure 9:
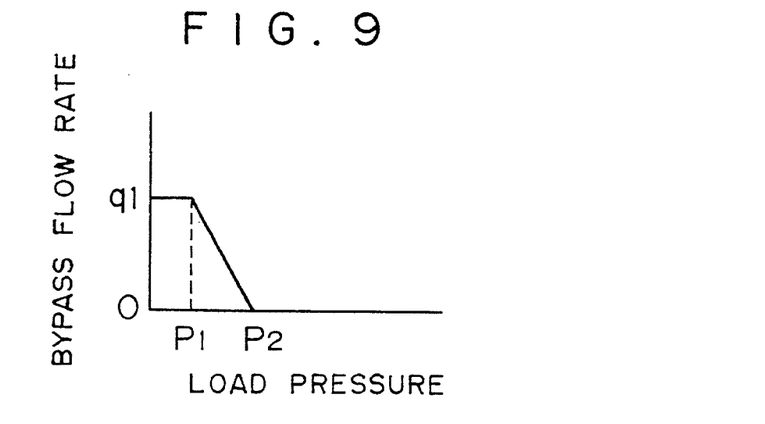
FIG. 9 is a graph showing the relationship between the bypass flow rate and the load pressure in the second embodiment.
Figure 10:
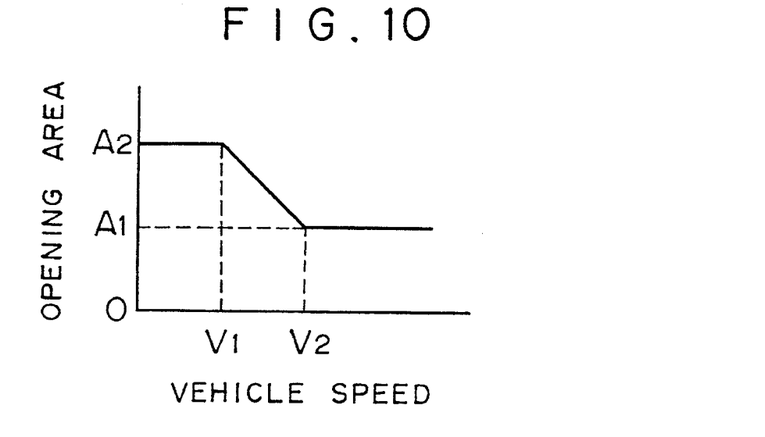
FIG. 10 is a graph showing the relationship between the total opening area of metering orifices and the traveling speed of a vehicle in the second embodiment.

Referring now to FIG. 8, a hydraulic power steering apparatus according to a second embodiment has a control rod 64 moved by an electromagnetic valve 63 for controlling the operating fluid supplied to a control valve 14' in addition to the constitution described in the first embodiment. Components having the same reference numerals as those in the first embodiment perform the same functions as those in the first embodiment. The description of such components is omitted for the sake of brevity and the following description will explain the differences between the first and second embodiments.

As shown in FIG. 8, a union 19 is composed of a joint 19c arranged around a union 19a which is threadedly fitted in the open end of the valve receiving bore 15. The union 19a retains press-fitted therein a sleeve member 19b. A supply bore 20' is formed in the sleeve member 19b, in which first and second metering orifices 21a and 21b are formed in parallel relation. The two orifices 21a and 21b correspond in function to the metering orifice 21 of the first embodiment. The supply bore 20' is in communication with the connection passage 27 through the second metering orifice 21b, an annular path 28b and a radial bore 28a. The supply bore 20' is in communication with an outlet port 22 of the joint 19c through the first and second metering orifice 21a, 21b and the annular path 28b. Accordingly, the flow control valve 23 is controlled by the differential pressure across the first and second metering orifices 21a and 21b (metering orifice 21).

Figure 7:
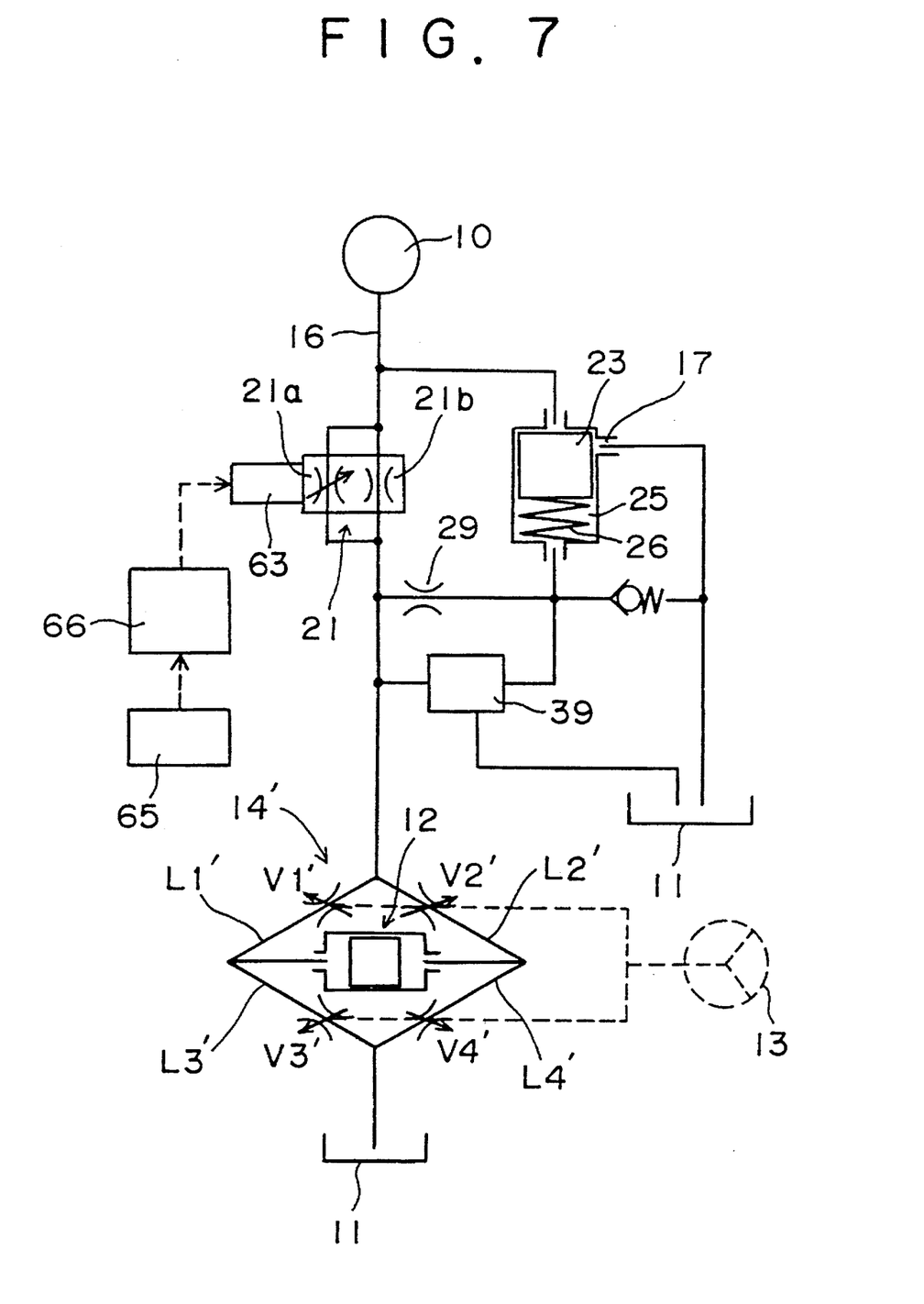
FIG. 7 is a diagram showing a power steering apparatus according to a second embodiment.

The electromagnetic valve 63 is threadedly fitted in the open end of the union 19a. The control rod 64 of the valve 63 is axially movable by a solenoid (not shown) of the valve 63 to selectively close the first metering orifice 21a. As shown in FIG. 7, a speed sensor 65 is connected with the electromagnetic valve 63 through an electronic control unit 66. The first metering orifice 21a and the control rod 64 constitute a variable orifice which is gradually closed as the vehicle traveling speed increases.

Unlike the control valve 14 in the first embodiment, the control valve 14' in this particular embodiment is of a conventional rotary center-open type. Namely, in its neutral state, center-open variable orifices V1' and V2' equally permit the operating fluid to pass therethrough, and center-open variable orifices V3' and V4' also equally permit the operating fluid to pass therethrough.

Figure 11:
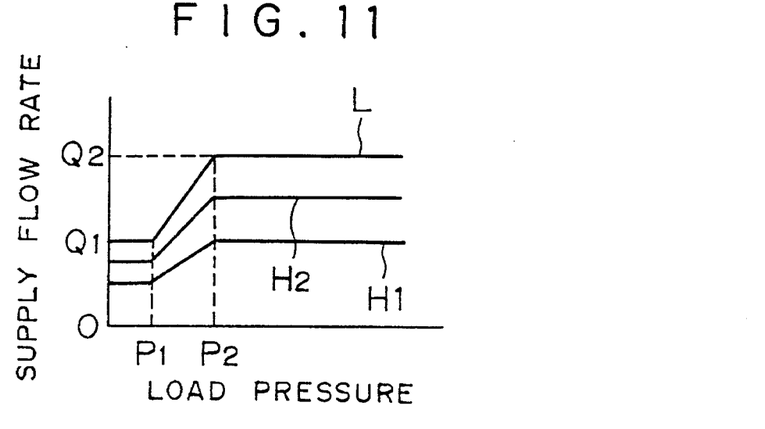
FIG. 11 is a graph showing the relationship between the supply flow rate to the control valve, and the load pressure and vehicle speed in the second embodiment.

When the traveling speed is at a low speed and when the steering wheel 13 is in the neutral state, the first orifice 21a is kept fully opened, so that the operating fluid of a flow rate $Q_1$ shown in FIG. 11, which is determined by the total throttle area of the first and second metering orifices 21a and 21b, is supplied to the control valve 14'. Strictly speaking, the flow rate to the control valve 14' is smaller than the $Q_1$, because a part of the $Q_1$ is drained to the reservoir 11 via the control orifice 29 and the bypass control valve 39. When the steering wheel 13 is turned in a slow traveling speed state, the supply flow rate Q to the control valve 14' is increased to the maximum flow rate $Q_2$ shown in FIG. 11 as the bypass control valve 39 closes its variable orifice 39a (FIG. 8).

On the other hand, the opening area of the first metering orifice 21a is gradually reduced by the control rod 64 as the vehicle speed increases. This causes the supply flow rate Q to the control valve 14' to change. The supply flow rates L, H2, H1 respectively correspond to low, medium and high vehicle speeds.

Third Embodiment

Figure 12:
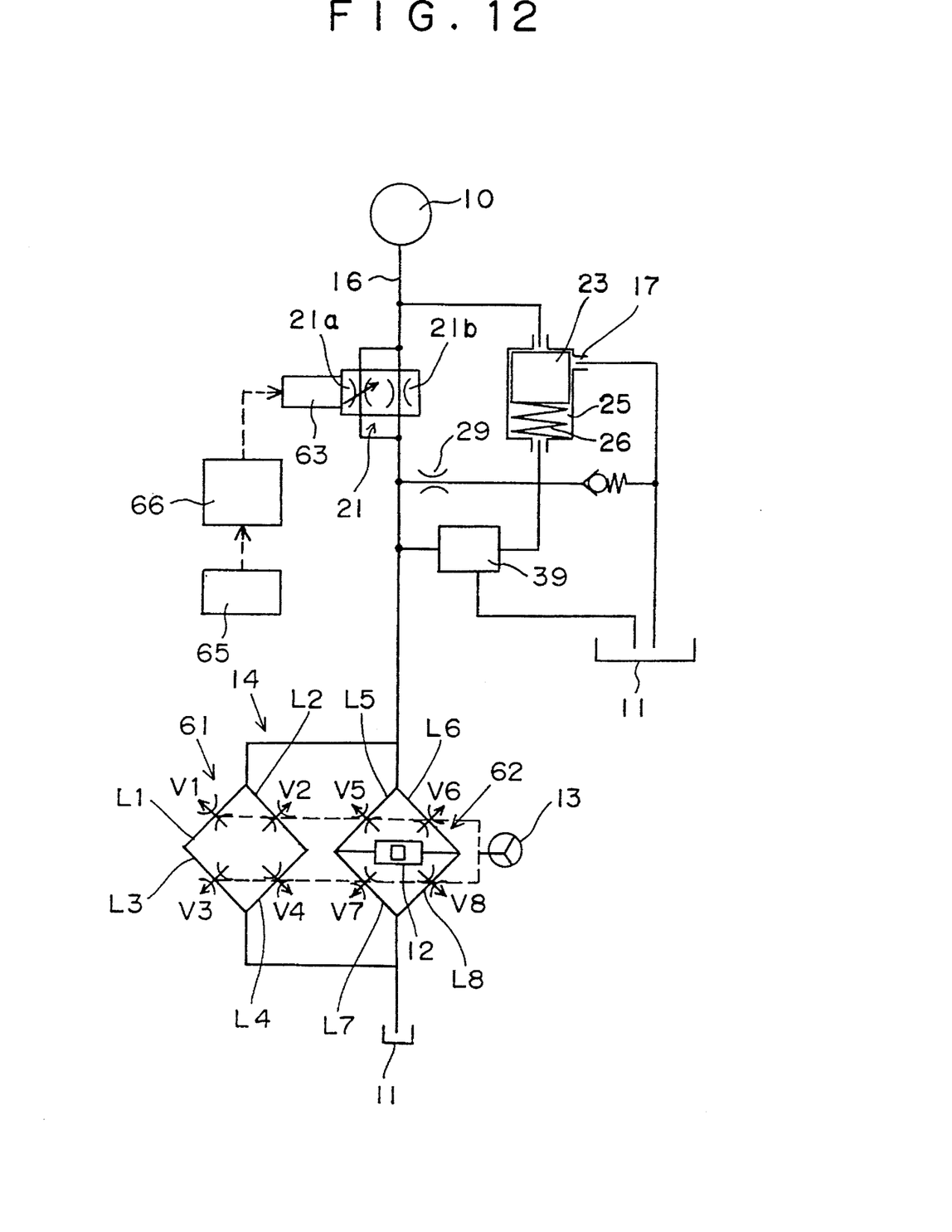
FIG. 12 is a diagram showing a third embodiment according to the present invention.

FIG. 12 illustrates a third embodiment according to the present invention. In this embodiment, a control valve 14 of the same configuration as that shown in FIG. 4 is used. The operation of this embodiment is same as the second embodiment except for the operation of the control valve 14 whose operation is same as that used in FIG. 4 of the first embodiment.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic power steering apparatus comprising:

a pump for supplying an operating fluid;

a power cylinder;

a reservoir;

a control valve connected to said pump, said power cylinder and said reservoir and responsive to a steering operation for controlling a supply of the operating fluid to said power cylinder;

a metering orifice disposed in a supply passage connecting said pump with said control valve;

a flow control valve disposed in a bypass passage connecting to the supply passage upstream of said metering orifice, and including a valve spool and a spring disposed in a spring chamber formed at a back of said valve spool, said spring chamber being connected to said supply passage downstream of said metering orifice via a control orifice; and a bypass control valve disposed in a passage connecting said control orifice and said spring chamber to said reservoir so as to bypass the operating fluid from downstream of said metering orifice to said reservoir and to lower the pressure in said spring chamber, wherein said bypass control valve comprises:
 a valve body;
 a valve sleeve of a generally cylindrical shape fit in a generally cylindrical bore of said valve body;
 a valve spool movable within said valve sleeve;
 a valve seat provided bodily with said valve sleeve and having a passage in communication with said spring chamber and said control orifice;
 a resilient means received within said valve sleeve for urging said valve spool against said valve seat;
 a drain port formed in said sleeve and connected with said reservoir; and
 a load pressure inlet port formed in said valve sleeve to apply the pressure upstream of said control orifice to said valve spool, said valve spool is movable responsive to a difference in pressure across said control orifice to control the flow rate of fluid from said passage of said valve seat to said drain port, and wherein said valve spool said valve seat and said resilient means are held within said valve sleeve to be removable bodily with said valve sleeve from said valve body.

2. A hydraulic power steering apparatus according to claim 1, wherein said valve spool and said passage of said valve seat are cylindrical and wherein the diameter of said passage of said valve seat is smaller than that of said valve spool.

3. A hydraulic power steering apparatus according to claim 1, wherein said valve body also receives said flow control valve therein, and wherein said valve spool of said bypass control valve and said valve spool of said flow control valve are arranged crossly and in parallel relation with each other.

4. A hydraulic power steering apparatus according to claim 1, wherein said control valve includes at least one set of variable orifice means of center-open type and disconnected from said power cylinder for permitting operating fluid to pass therethrough to said reservoir.

5. A hydraulic power steering apparatus according to claim 4, wherein said control valve further includes another set of variable orifice means including center-closed orifice portions for restricting the supply of operating fluid to opposite chambers of said power cylinder when said control valve is in its neutral state.

6. A hydraulic power steering apparatus according to claim 1, further comprising:

another metering orifice provided in parallel relation with said metering orifice for controlling flow rate from said pump toward said control valve, an electromagnetic valve means for changing the opening area of said another metering orifice, and a drive circuit responsive to a vehicle speed for actuating said electromagnetic valve means.

* * * * *